US010268664B2

(12) United States Patent
Zheng et al.

(10) Patent No.: US 10,268,664 B2
(45) Date of Patent: Apr. 23, 2019

(54) EMBEDDING LINKS IN USER-CREATED CONTENT ON ONLINE SOCIAL NETWORKS

(71) Applicant: Facebook, Inc., Menlo Park, CA (US)

(72) Inventors: Shuyi Zheng, Fremont, CA (US); Brett Matthew Westervelt, Menlo Park, CA (US); Rousseau Newaz Kazi, San Francisco, CA (US); Alexander Paul Mentch, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 599 days.

(21) Appl. No.: 14/835,289

(22) Filed: Aug. 25, 2015

(65) Prior Publication Data

US 2017/0060823 A1    Mar. 2, 2017

(51) Int. Cl.
| | |
|---|---|
| *G06F 3/00* | (2006.01) |
| *G06F 17/22* | (2006.01) |
| *G06F 17/30* | (2006.01) |
| *G06F 3/0482* | (2013.01) |
| *G06F 3/0484* | (2013.01) |
| *G06F 17/24* | (2006.01) |
| *H04L 12/58* | (2006.01) |

(52) U.S. Cl.
CPC ........ *G06F 17/2235* (2013.01); *G06F 3/0482* (2013.01); *G06F 3/04842* (2013.01); *G06F 17/24* (2013.01); *G06F 17/3053* (2013.01); *G06F 17/30528* (2013.01); *G06F 17/30554* (2013.01); *G06F 17/30867* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 5,918,014 | A | 6/1999 | Robinson |
| 6,539,232 | B2 | 3/2003 | Hendrey |
| 6,957,184 | B2 | 10/2005 | Schmid |
| 7,069,308 | B2 | 6/2006 | Abrams |
| 7,379,811 | B2 | 5/2008 | Rasmussen |
| 7,539,697 | B1 | 5/2009 | Akella |
| 7,752,326 | B2 | 7/2010 | Smit |
| 7,783,630 | B1 | 8/2010 | Chevalier |
| 7,836,044 | B2 | 11/2010 | Kamvar |
| 8,027,990 | B1 | 9/2011 | Mysen |
| 8,055,673 | B2 | 11/2011 | Churchill |

(Continued)

*Primary Examiner* — Thanh T Vu
(74) *Attorney, Agent, or Firm* — Baker Botts L.L.P.

(57) ABSTRACT

In one embodiment, a method includes receiving, from a link-search interface of a client device, a search query from a first user of an online social network. The link-search interface is associated with a composer interface in which the first user is composing a first post. The method further includes searching a web index of an online social network to identify one or more external objects matching a search query. The web index identifies a plurality of external objects hosted by third-party systems that have been posted to the online social network, and each search result comprises a reference to the respective external object and a link to the external object. The method further includes embedding, in the first post, a link to a first external object referenced by a first search result selected by the first user.

47 Claims, 11 Drawing Sheets

(56) References Cited

U.S. PATENT DOCUMENTS

| | | |
|---|---|---|
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 * | 11/2013 | Druzgalski ......... G06F 17/3087 715/234 |
| 8,595,297 B2 * | 11/2013 | Marcucci ............... G06Q 10/10 709/204 |
| 8,601,027 B2 | 12/2013 | Behforooz |
| 8,606,721 B1 * | 12/2013 | Dicker .................. G06Q 50/01 705/319 |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2014/0006416 A1 | 1/2014 | Leslie |
| 2014/0067535 A1 | 3/2014 | Rezaei |
| 2014/0122465 A1 | 5/2014 | Bilinski |
| 2014/0189534 A1 * | 7/2014 | Liu ........................ G06F 3/01 715/753 |

* cited by examiner

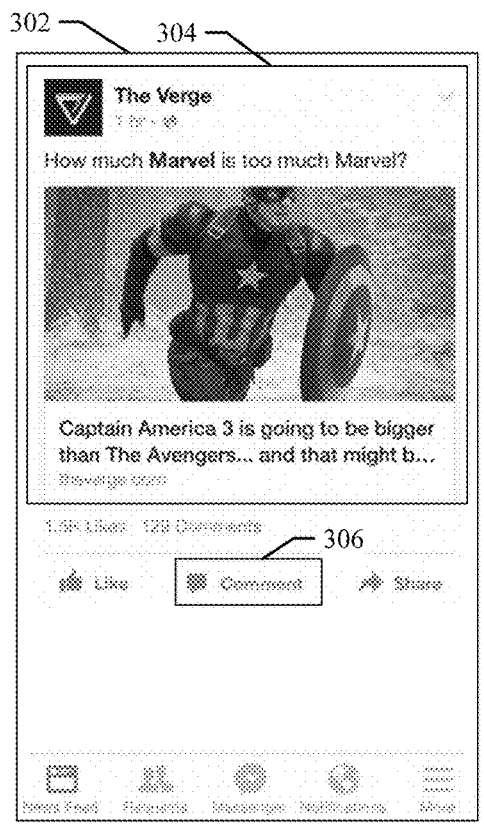 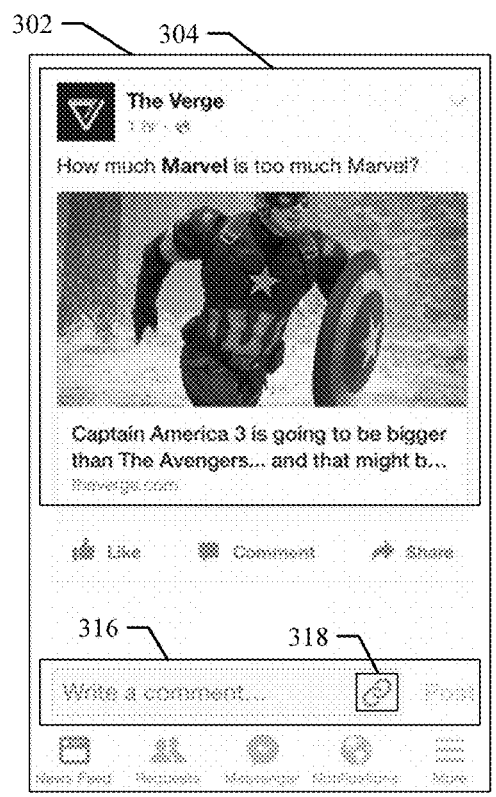
*FIG. 3A*        *FIG. 3B*

*FIG. 3C*  *FIG. 3D*

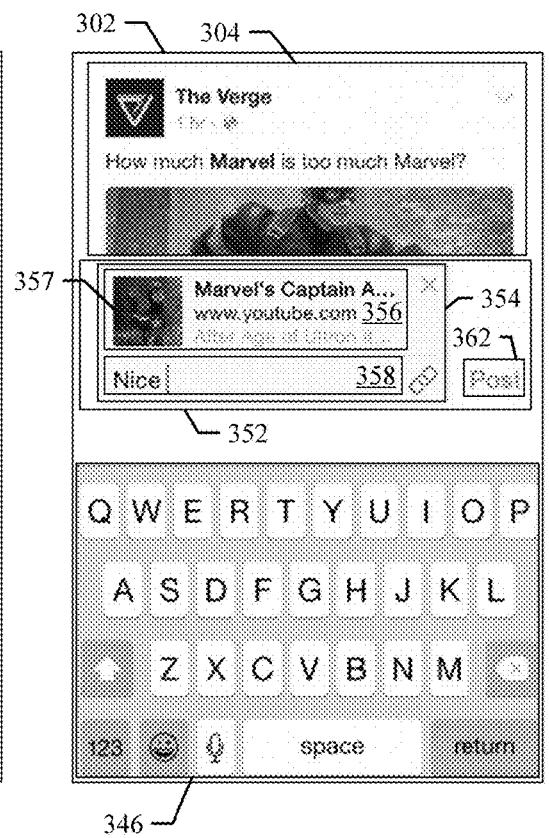
*FIG. 3E*     *FIG. 3F*

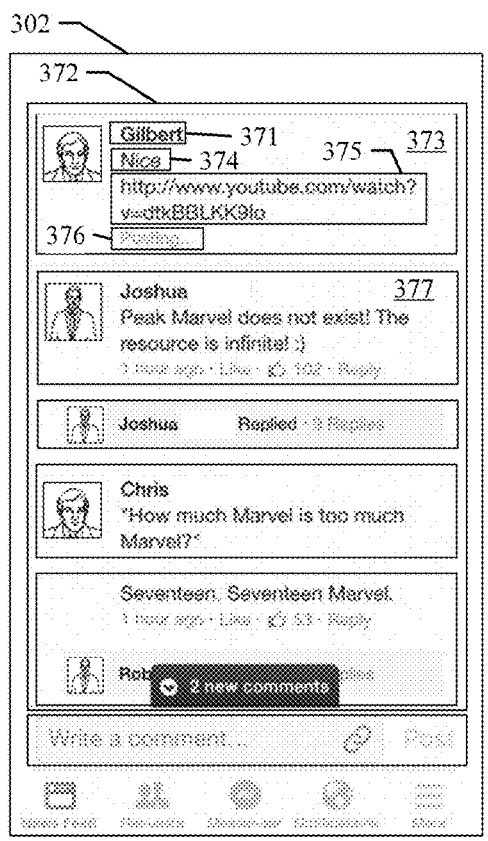
*FIG. 3G*  *FIG. 3H*

 
*FIG. 4C*  *FIG. 4D*

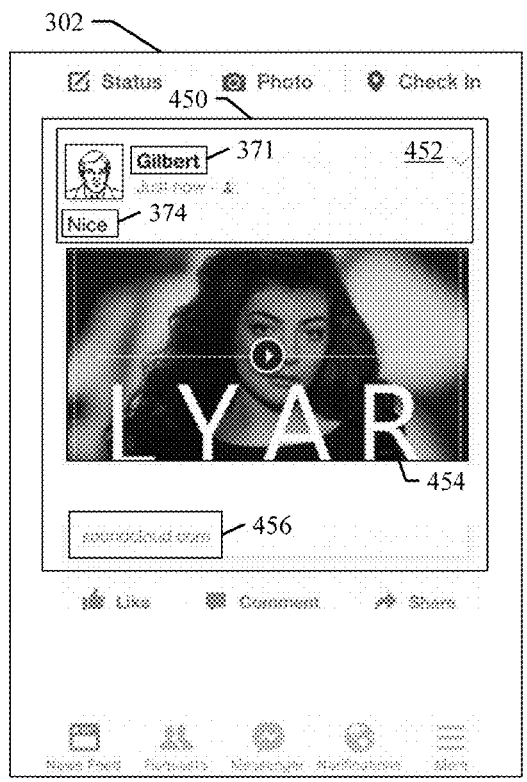
*FIG. 4E*  *FIG. 4F*

EMBEDDING LINKS IN USER-CREATED CONTENT ON ONLINE SOCIAL NETWORKS

TECHNICAL FIELD

This disclosure generally relates to linking to content within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-network application provides a composer user interface that enables users to create content on their mobile devices, and to embed links to other content, such as web pages, in the content being created. The user-created content may include posts, comments, reviews, messages, and the like. While composing a post, a user may select a link icon in the composer to search for and embed links to internal or external content (such as web pages, applications, or multimedia content) in the post. For example, when the user selects the link icon, the link-search interface may present a list of suggested links and a query field in which the user may input a search query. When the user inputs a search query, the mobile application initiates a search, using a search index, to identify content objects that match the search query. The content objects may be web pages, images, videos, social-network pages, or the like. The search results may be links to content objects substantially matching the search query. The index may be a web index generated by the social-networking system based on links shared or otherwise referenced by users of the social-networking system. The search results may include short descriptions and/or graphical renderings of the matching content objects, and are presented to the user in the link-search interface. The user may select one of the search results for inclusion in the post, at which point a link to the corresponding selected content object is embedded in the post being composed. When the user submits the post to the social-networking system, the embedded link may be submitted along with the post. Subsequently, when the post is presented, e.g., in a user's newsfeed, the social-networking system may present the matching content object in association with or as part of the post. Since the link-sharing feature is provided within the social-network application, there is no need for users to switch between applications when sharing links. Thus, a user can select the link icon, type in a few characters, and easily embed a selected link in any conversation.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates an example of a post presented in an application user interface of an online social network.

FIG. 3B illustrates an example of a composer user interface for composing comments on an online social network.

FIG. 3C illustrates an example of a link-search interface for receiving a link to be added to a comment on an online social network.

FIG. 3D illustrates an example of a link-search interface receiving a search query and displaying matching content objects on an online social network.

FIG. 3E illustrates an example of a composer user interface showing a link in a comment being composed.

FIG. 3F illustrates an example of a composer user interface showing text and a link in a comment being composed.

FIG. 3G illustrates an example of a comment that includes a link to content being posted on the online social network.

FIG. 3H illustrates an example of a comment that includes a link to a web content object on an online social network.

FIG. 4C illustrates an example of a link-search interface for receiving a link to be added to a status update on an online social network.

FIG. 4D illustrates an example of a link-search interface receiving a search query and displaying matching content objects on an online social network.

FIG. 4E illustrates an example of a composer user interface showing text and a link in a status updated being composed on an online social network.

FIG. 4F illustrates an example of a status update that includes a link to video content on an online social network.

DESCRIPTION OF EXAMPLE EMBODIMENTS

System Overview

Figure 1:
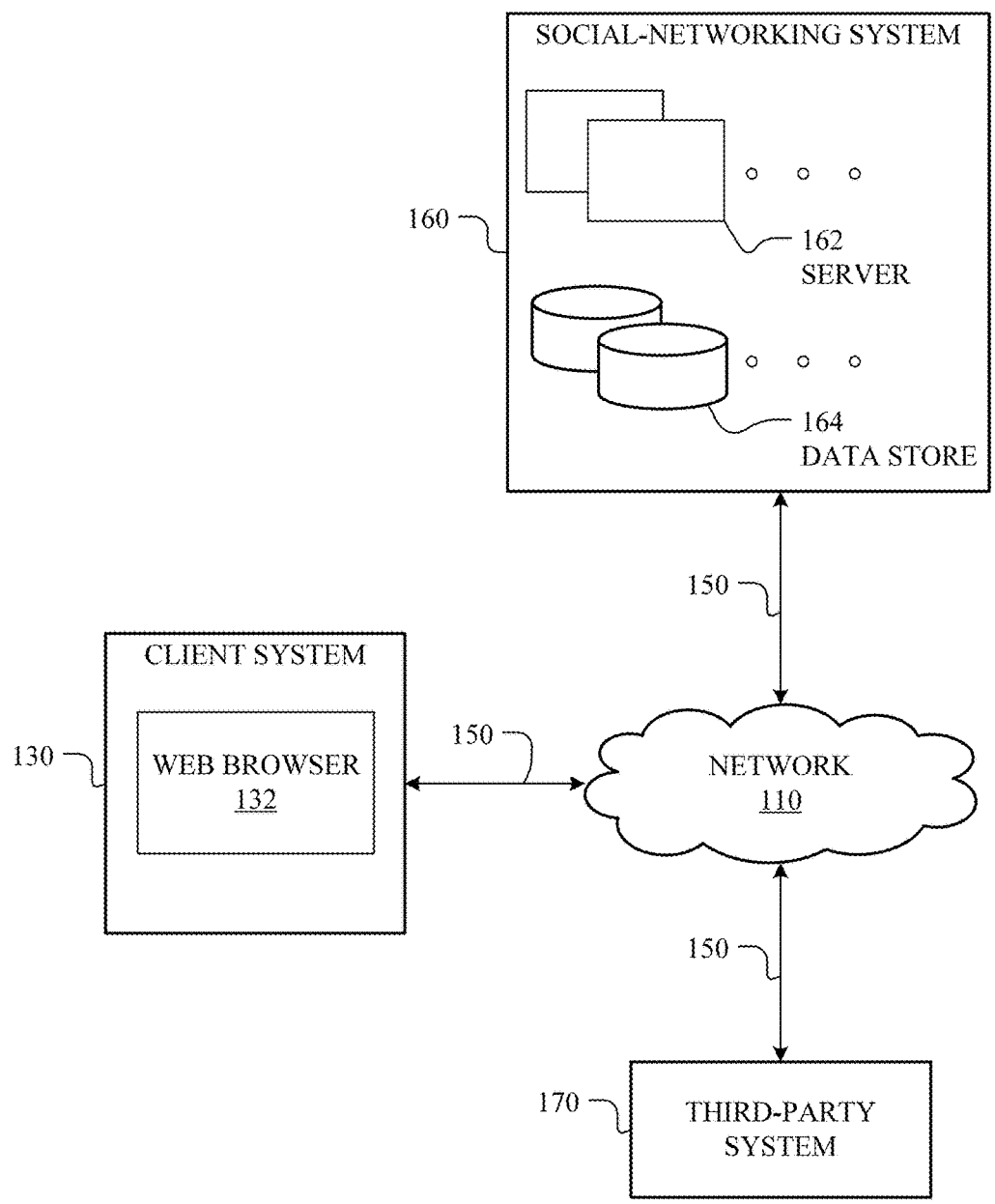
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-andnetwork-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
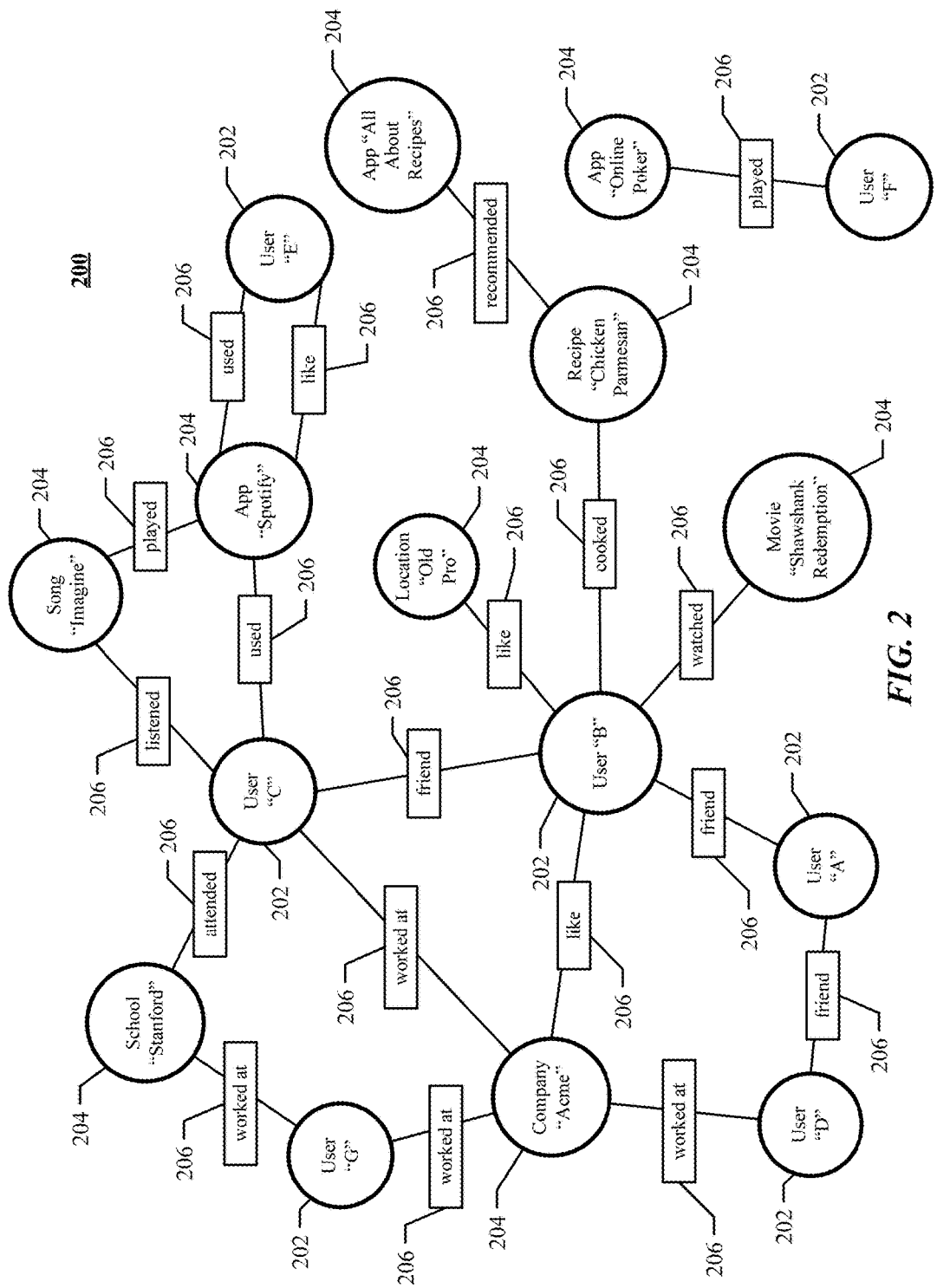
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY"). In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into a query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr.

2010, and U.S. patent application Ser. No. 13/556,072, filed 23 Jul. 2012, each of which is incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12

Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Embedding Links in User-Created Content

FIGS. 3A-3H and 4A-4F illustrate example online social-network user interfaces for composing content that includes links to other content. In particular embodiments, the illustrated online social-network user interfaces include an application user interface 302, and may be presented by a native application associated with the online social network, such as a social-networking application executing on a client device 130 of a user, by a web browser 132, by a messaging application, another suitable application, or any combination thereof. The application or web browser may also present other user interfaces that are not shown, which enable the user to access other features of the social-networking system 160.

In particular embodiments, a social-networking mobile application provides a composer user interface that enables users to create content on their client devices 130, and to embed links to other content, such as web pages, in the content being created. The user-created content may include posts, comments, reviews, messages, and the like. While composing a post, a user may select a link icon in the composer interface to search for and embed links to content, such as web pages, in the post. The link icon may be a user-selectable graphical user interface element that represents a link, such as an image of a chain link, or a text element, e.g. "Link", or other user-selectable element presented in the composer interface. A user may select a graphical user interface element by, for example, clicking a mouse device while a mouse pointer is displayed on the element in the user interface, by touching a representation of the element on a touch screen, or by another type of interaction, such as a voice command. As an example, and not by way of limitation, in the social-networking mobile application, when the user selects the link icon, the link-search interface may present the query field in which the user may input a search query to search for content to be linked to. The link-search interface enables the user to search for and embed links into posts using the composer interface of the social-networking mobile application, instead of finding links in a separate application (such as a web browser) and copying and pasting the links into the social-network application, thereby making it easier for users to link to and share content via the social-networking mobile application. Although this disclosure discusses embedding links into posts, this disclosure contemplates embedding links into any suitable user-created content, such as, for example, comments, reshares, check-ins, reviews, or other suitable user-created content. Furthermore, although this disclosure discusses embedding links using a social-networking mobile application, this disclosure contemplates embedding links into user-created content using any suitable application, including web browsers, third-party applications, or other suitable applications.

In particular embodiments, prior to receiving input in the text input area, the link-search interface may present an initial list of suggested content objects. Links to content objects may be embedded in content being composed. Content objects may be items of content, including internal content of the online social network or external content on third-party sites. The content objects may be individual web pages, videos, multimedia objects, URLs to third-party website, deep links into applications, links to internal content of the online social network, or other suitable links. The initial list of content objects may include recently-selected content objects, content objects from the user's newsfeed, or a combination of those. That is, the list of suggested content objects may be displayed when the user interface is in a null search state. The list of suggested content objects may include content objects the user has recently viewed or accessed (e.g., clicked or otherwise selected in a newsfeed), content objects the user has recently marked as "liked" on the social-networking system, content objects shared by friends of the user, objects saved by the user, objects popular among users, and the like. The number of suggested content objects may be limited to 5, 10, 15, or other appropriate number of objects. The user may select one of the suggested content objects instead of inputting a search query, in which case a link to the selected content object may be embedded in the post, as described below. The list of suggested content objects may be incrementally updated to match the search query as characters of the query are received. The suggested content objects may be displayed in an arbitrary order, or may be displayed in a sorted order in which they are ranked based on text features or other features of the content objects. For example, the content objects displayed in the link-search interface may be displayed in a ranked order based on ranking features such as the text of the content, a headline of the content, the number of people who have shared the link, presence of popular noun phrases in the content, and so on. The ranking features may also include popular noun phrases present in the external object, a number of social signals associated with the external object, or any combination thereof. The ranking of each content object may be weighted by a number of times the content object has been shared. More information on searching and social signals may be found in U.S. patent application Ser. No. 12/763,162, filed 19 Apr. 2010, U.S. patent application Ser. No. 13/556,072, filed 23 Jul. 2012, and U.S. patent application Ser. No. 14/826,868, filed 14 Aug. 2015, which are incorporated by reference. More information on ranking content may be found in U.S. patent application Ser. No. 14/341,148, filed 25 Jul. 2014, and U.S. patent application Ser. No. 14/533,229, filed 5 Nov. 2014, which are incorporated by reference.

The link sharing feature may be used to embed links into friends' newsfeeds, into comments, posts, and into any other type of content a user creates in the social-networking mobile application. This link sharing feature can also be added to other applications that use a composer-type input, such as a social-network web site or a social-network messenger application. As an example, a user composing a message about the movie Captain America 3 may select (e.g., tap) a link icon displayed in the bottom-right corner of the composer interface in the messenger application. A search interface is displayed, with an initial list of recently clicked links in the null state. The user types "captain America trailer" in the search query text box, and a list of links that match the query is displayed. The list may include videos from YouTube, Vimeo, etc., and other related content. The user may select one of the videos, preview the video, and, if desired, select an Add Link command to add a link to video to a message being composed. A thumbnail image of a frame from the selected video is displayed in the message being composed, and other users who receive the message can tap the thumbnail image to display the actual video.

As another example, a user of a social-network web site interface who is composing a comment related to the movie Captain America 3 and select (e.g., tap) the link icon displayed in the bottom-right corner. A search interface is displayed, with an initial list of recently clicked links in the null state. The user types "captain America trailer" in the search query text box, and a list of links that match the query is displayed. The list may include videos from YouTube, Vimeo, etc., and other related content. The user may select one of the videos, preview the video, and, if desired, select an Add Link command to add a link to video to the comment. A thumbnail image of a frame from the selected video is displayed in the comment, and other users who view the comment can tap the thumbnail image to display the actual video.

Figure 4A:
FIG. 4A illustrates an example of a newsfeed user interface displaying a post posts an online social network.

In particular embodiments, the social-networking system 160 may receive, from a link-search interface of a client device 130, a search query inputted into the link-search interface by a first user of an online social network. The link-search interface may be associated with a composer interface in which the first user is composing a first post. In particular embodiments, the composer interface may include a selectable link-search element that can generate the link-search interface, and the link-search interface may be displayed on the client device 130 in response to receiving an indication that the first user has selected the link-search element. As an example and not by way of limitation, as shown in FIG. 3B, the composer user interface 316 includes a link icon 318, which may be selected to embed a link in a comment being composed. As another example and not by way of limitation, as shown in FIG. 4A, the application user interface 302 may provide a social-network status update feature that can embed links to content objects in status updates. A user may select a status update button 402 to cause a status composer user interface 412 to be presented. The status composer user interface 412 may receive content, such as text and a link to other content to be included in the comment. The text content may be received in a text input field 414 from a user via an input interface such as the touch-screen keyboard 346. A command toolbar 418 may include a link icon 318, which a user may select to embed a link in the status update.

Figure 4B:
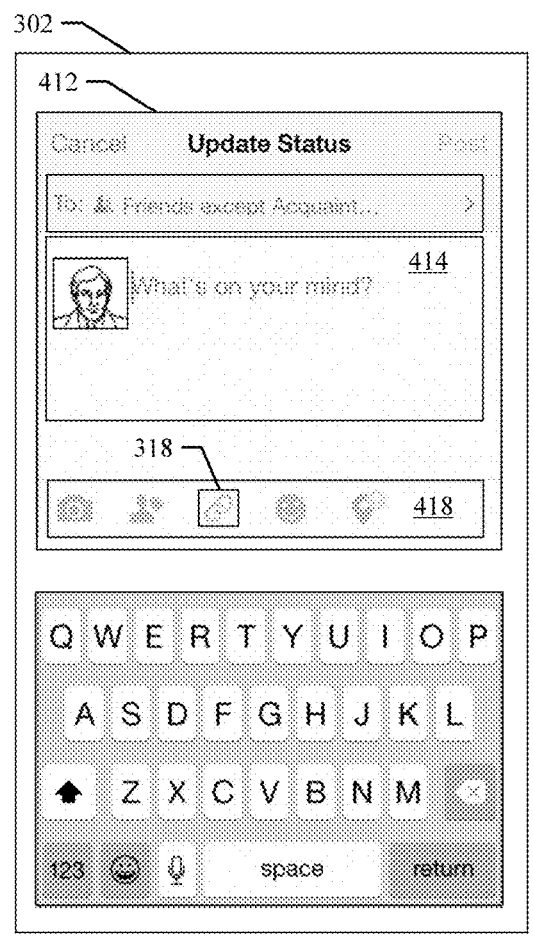
FIG. 4B illustrates an example of a status update user interface on an online social network

In particular embodiments, the link-search interface may include a query input interface configured to receive the search query. In particular embodiments, the social-networking system 160 may receive, at the client device 130, a request for the link-search interface. The link-search interface may be displayed on the client device 130 responsive to the request. As an example and not by way of limitation, when the link icon 318 of FIG. 3B is selected, a link-search interface 332 is presented in the application user interface 302, as shown in FIG. 3C. The link-search interface 332 may enable a user to search for and select additional content to be embedded in the content being composed. The link-search interface 332 may present a search query field 334 in which a user may input a search query, and also presents a list of content objects 336. The content objects 336 may be textual and/or graphical representations of actual content objects such as web pages, articles, multimedia files, and the like. It should be understood that the graphical representations are referred to herein as content objects 338 for explanatory purposes. As another example and not by way of limitation, when the link icon 318 of FIG. 4B is selected, a link-search interface 332 is presented, as shown in FIG. 4C. As an example and not by way of limitation, a search query may be typed into the search field 334 by the user. The search query may include one or more n-grams. For example, the user may input a search query in the query input field 334 of FIG. 4C using the touch-screen keyboard 346. The mobile application may automatically receive the search query in real-time as the user types text into the input field 334 without the need for any further confirmation input from the user. Alternatively, the social-networking system 160 may receive the search query upon a confirmation input by the user (e.g., the pressing of the enter key, the clicking of a "search" button such as that shown in FIG. 3D).

In particular embodiments, the social-networking system 160 may send, to the client device 130, one or more null-state search results for display in the link-search interface to the first user. Each null-state search result may include a reference and a link to an external object previously selected or recently viewed by the first user. Each of the external objects may include text, a web page, a web link, a graphical image, a video object, an audio object, a multimedia object, an application, or any combination thereof. The reference to the external object may be a name, title, description, thumbnail image, snippet, mini-preview of the external object. The link to the external object may be a web link such as a URL. There may be a threshold number of null-state search results. In particular embodiments, the link-search interface may be pre-populated with a prior search query previously inputted by the first user, and the null-state search results may correspond to one or more external objects matching the prior search query. In particular embodiments, the search query may include a character string of one or more characters, and the search results may be generated responsive to the first user inputting an additional character into the character string. As an example and not by way of limitation, as shown in FIG. 3C, a list of content objects 336 may be a list of recently-clicked content objects, such as a content object 338, or list of matching content objects that match a search query received in the query field 334, or a combination of suggested and matching content objects. Each content object may be an external content object hosted by an Internet web site or other server external to the social-networking system, or an internal content object, e.g., an object hosted by the social-networking system. Each displayed content object 338 may include title text, e.g., "The Hollywood Star . . . " a name or URL of the source of the content object 338, e.g., "takeapart.com", information about the number of times the content object 338 has been shared, e.g., "30.3K Shares", and the date on which the user most recently clicked on the content object 338, e.g., "on Tuesday." An image associated with each content object, such as a thumbnail image 337, may also be displayed.

As another example and not by way of limitation, the list of suggested content objects 336 of FIG. 3C or 4C may be displayed when the link-search interface 332 is presented, prior to receiving any input in the search query field 334. Input may be received from the user in the search query field 334 via a touch screen keyboard 346 or other input interface. Subsequent to receiving input in the search query field 334, such as one or more characters of text, some or all of the suggested content objects 336 may continue to be displayed, or may be replaced by or combined in the displayed list with one or more of the search results 342, 344 (shown in FIG. 3D) or one or more of the search results 436-449 (shown in FIG. 4D) that match the search query.

In particular embodiments, the social-networking system 160 may generate one or more search results corresponding to the search query by searching a web index of an online social network to identify one or more external objects matching the search query, respectively. The web index may identify external objects hosted by third-party systems that have been posted to the online social network. Each search result may include a reference to the respective external object and a link to the external object. In particular embodiments, the web index may index the external objects and one or more keywords associated with each external object. Each identified external object in the search results may be indexed with one or more keywords substantially matching the search query. When a search query is received in the query field, the mobile application initiates a search that uses a search index to identify content objects matching the search query. The search may be performed by a search component of the social-networking system executing on the server 162, by a client device 130 executing the mobile application, or by a combination of those. The content objects may be web pages, images, videos, social-network pages, or the like. Note that the term "social-network content" is used herein to refer to content generated by or received by the social-networking system, such as articles, posts, comments, and the like. The social-network content may be hosted by the social-networking system (e.g., stored on the social-network storage device 206). Although this disclosure describes using a web index to identifying particular objects in a particular manner, this disclosure contemplates using any suitable index to identifying any suitable objects in any suitable manner. For example, in particular embodiments, social-networking system 160 may generate one or more search results corresponding to the search query by searching a native-content index of an online social network to identify one or more internal objects matching the search query, respectively. Similarly, functionality related to embedding links to content objects, as described below, may also be used to link to internal content objects.

As an example and not by way of limitation, as shown in FIG. 3D, when a user inputs a search query "Captain America trailer" in the query input field 334, a search for content objects that match the query is performed. For example, the search may identify the matching content objects 342, 344, which are displayed in association with respective thumbnail images 343, 345. The matching content objects 342, 344 match the query "Captain America trailer" because the text of each of the matching content objects 342, 344 contains at least some of the words "Captain America" and "trailer". The matching content objects 342, 344 may be internal content objects, external content objects, or a combination of both.

In particular embodiments, the user may select one of the search results to embed in the post. A link to the selected content object (which is referenced by the selected search result) is then embedded in the content being composed. For example, the selected link may be embedded inline into the content being composed, e.g., into a status update, post, or comment the user is composing. Note that the term "embed" as used herein refers to creating an association between the post and the link to the selected content object, which may be done by inserting a textual (e.g., URL) representation of the link in the post, or appending the textual representation to the post, or establishing an association between the link and the post in memory 204 and/or a storage device 206 of the social-networking system. The link may be embedded by, e.g., adding a text string representation of the URL with appropriate link tags (e.g., an HTML <a> tag with an href attribute, such as <a href="www.example.com/page">Title text</a>, or the like) to the post, or otherwise associating the link with the post. Optionally, additional portions of the selected content object, such as the short descriptions and/or graphical rendering of the selected content object may be embedded in the post, e.g., by adding the text of the short description and/or a link to the graphical rendering to the post. Embedding these additional portions to the post may improve response time when the post is subsequently presented to users. Alternatively, the content of the selected content object may be retrieved from the location referenced by the link associated with the post when the post is presented (e.g., from a web site identified in the link).

The embedded link and/or its corresponding matching content object may be displayed in the composer interface to indicate that it has been embedded in the post. That is, the link may be displayed as a URL and/or a preview image (e.g., a graphical rendering or thumbnail image of the content associated with the link). The composer interface may provide user-selectable commands to remove the link and enable association of another link with the post in place of or in addition to a previously-associated link. When the user submits the post to the social-networking system, the embedded link may be submitted along with the post content (e.g., with the text of the post).

The social-networking system 160 may store the post, including the embedded link, and optionally at least a portion of the matching content object referenced by the link. Subsequently, when the post is presented, e.g., in a user's newsfeed, the social-networking system 160 may present the matching content object in association with or as part of the post.

As another example and not by way of limitation, as shown in FIG. 4D, when a user inputs the search query "Lorde soundcloud" in a query input field 334, a search for content objects that match the query is performed. For example, the search may identify the matching content objects 436-449, which are displayed in association with respective thumbnail images. The matching content objects 436-449 match the query "Lorde soundcloud" because the information associated with each of the matching content objects 342, 344 contains the words "Lorde soundcloud". The information may include text content and/or other information, e.g., the source of content, such as soundcloud.com. When the user selects one of the matching content objects 436-449, a link to the selected content object is embedded in the comment being composed. For example, if the user selects the content object 436, which is an audio file located on a web page hosted by the site soundcloud.com, a web link to the soundcloud.com audio file is embedded in the status update being composed, as shown in FIG. 4E.

The search results may be links to matching content objects, e.g., content objects that substantially match the search query. The search results may be presented in the link-search interface, and may be generated and updated incrementally for each character of input, e.g., as a type-ahead search. The content that is searched (and the matching content objects) may include web content such as web content hosted by Internet web sites, social-network content, social-network metadata associated with the web content or the social-network content, or other searchable content. As an example, and not by way of limitation, the portions of content that are searched may include the first paragraph of text in a web page or article, a headline or title of a web page or article, and comments made by users when sharing a link to the web page or article. For example, the comments in each comment thread associated with the article may be searched. The social-network metadata may include comments, minutiae elements (e.g., expressions of users' moods) associated with the Internet web content or social-network content by social-networking system users. The comments may be made when the content is shared or read by the users, for example. The social-network metadata may also include other information associated with the content by the social-networking system, such as counts of the number of users who have accessed the content, or have marked the content with an indication such as "liked", "disliked, "spam", or the like. Although this disclosure describes generating search results in a particular manner, this disclosure contemplates generating search results in any suitable manner.

In particular embodiments, in searching the web index to identify one or more external objects matching the search query, the social-networking system 160 may access the web index, and the web index may include a plurality of entries. Each entry may include a link to an external object and one or more keywords extracted from a post, reshare, comment, or message that includes a link to the external object. In particular embodiments, in searching the web index to identify one or more external objects matching the search query, the social-networking system 160 may identify one or more posts, reshares, comments, or messages linking to one or more linked external objects based on matching the search query with the one or more keywords extracted from the identified one or more posts, reshares, comments, or messages. The one or more identified external objects matching the search query may be linked to by the one or more posts, reshares, comments, or messages.

In particular embodiments, the social-networking system 160 may calculate, for each identified external object, an object-score based on one or more social signals associated with the identified external object. The respective external object be referenced by each search result may have an object-score greater than a threshold score. The search-results page may display the search results ranked based at least in part on the object-score of each external object.

In particular embodiments, the web index may include at least one counter that records a number of social signals associated with each external object within the online social network, and the object-score for each identified external object is calculated based on the counter associated with the identified external object. Each entry of the web index may include a URL of an external object hosted by the third-party system, one or more post identifiers each linking to each of one or more posts of the online social network that comprise the URL of the entry of the index, the counter that records the number of social signals associated with the external object, and metadata associated with the external object linked in the particular post, the metadata comprising information associated with the external object. The social signals associated with each external object may include an indication of a post linking to the external object. The post may include including one or more of: an original post linking to the external object, a comment on a post linking to the external object, and/or a reshare of a post linking to the external object. The social signals may include an accessing or viewing of the original post, the comment, or the reshare linking to the external object, a like of the original post, the comment, or the reshare linking to the external object, a click-thru of a link to the external object in the original post, the comment, and/or the reshare linking to the external object.

As an example and not by way of limitation, the search index may be a mapping from particular words of content or social-network metadata to links referring to content objects that contain the particular words, and the search may use the search index to identify links to content objects that contain words that are in (e.g., match) the search query. The search index may be a web index generated by the social-networking system based on links shared or otherwise referenced by users of the social-networking system. The web index may enable the mobile application to search the content of Internet web pages, social-network content, and social-network metadata.

As another example and not by way of limitation, the web index may be searched using a web "share index" that only indexes links posted (or shared, commented on, or the like) on the social-networking system, instead of attempting to search the larger set of links that exist on the Internet. The share index stores the links and relevant conversation snippets for each of the links shared. When a new (e.g., previously not shared) link is shared to the online social network, the new link is added to the share index, and the share count of the link is incremented. The share index can be searched for the desired text, and the search identifies links to content items that contain or are otherwise relevant to the desired text. The social-network web index may be used to find links to be shared by users creating content, since the web index contains a large quantity of links that users have previously shared and commented on. Both external (e.g., Internet) and internal content (e.g., native videos and/or articles stored internally by the online social network) can be linked to.

When a user posts a link to a multimedia object (e.g., a video link), the social-networking system 160 may extract text associated with the multimedia object (e.g., text in the post, the title of the multimedia object, text from a summary generated by embedding the link in the post, etc.) as keywords. The social-networking system 160 may then create an association in the search index between the keywords and the multimedia object, so that a search can find the multimedia object when the keywords are specified in a search query. However, post that link to multimedia objects do not necessarily include useful or descriptive text (i.e., text that describes the substance of the multimedia object itself) that the average user may search for when searching for multimedia objects. Posts that link to native embedded multimedia objects of an online social network often have no associated title or description. For example, a post containing a video of a cat may be titled simply "LOL". However, in reshares of posts, people often include descriptive text about what they are resharing (e.g., "Check out this video of my friend's cat playing a piano!"). Consequently, it is useful to extract text from reshares of posts linking to multimedia objects, and to index the multimedia objects with their respective keywords extracted from these reshares. In particular embodiments, the social-networking system 160 may receive a search query for multimedia objects from a user and, in response, search an index of multimedia objects to identify multimedia objects based on the search query. The social-networking system 160 may then generate and send search results to the user that include references to the identified multimedia objects. Although this disclosure focuses on search queries that are keyword search queries, this disclosure contemplates search queries of any suitable type (e.g., structured search queries). The term "post" as used herein may include a publication that contains multimedia content on an online social network by a user, where the publication does not reference another publication on the online social network. The term "reshare" as used herein may include a publication that contains multimedia content on an online social network by a user, where the publication references another publication on the online social network (for example, a post may be linked to or embedded in the reshare). A publication may include a post, reshare, or comment made by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network. The term "message" as used herein may include a message sent between two or more users in a messaging application associated with the online social network. The terms "link to the multimedia object" or "multimedia-object link" are used interchangeably herein and may refer to either a multimedia object that exists natively on the online social network or to a multimedia object that exists on a third-party website. Such a link may include a URL or URI (which may include deep links to apps), an embedded object, or any other suitable reference. Although this disclosure describes identifying particular objects based on a search query in a particular manner, this disclosure contemplates identifying any suitable objects in any suitable manner. More information on multimedia search may be found in U.S. patent application Ser. No. 14/609,084 filed 29 Jan. 2015, which is incorporated by reference.

As an example and not by way of limitation, the title of a video of a man racing the London tube may be a short phrase such as "Tube Race." However, users may search for "man beats train" because that phrase more accurately describes the video. However, the words "man beats train" are not in the video's title and description, and are not in the list of associated keywords (which may be, e.g., London and tube), so a search of the video's title, description, and keywords for "man beats train" does not find the video. However, users who share or comment on the video may add comments such as "check out this man beating this train." These comments may be stored in the metadata associated with the video (or with the page on which the video is embedded). Therefore, a search of the metadata associated with the video for the query "man beats train" finds the video.

In particular embodiments, the search index may be an index of multimedia objects, and the social-networking system 160 may search the index of multimedia objects to identify one or more multimedia objects based on the search query. The index of multimedia objects may be an index of a plurality of multimedia objects that includes one or more keywords associated with each multimedia object. The keywords may be extracted from one or more posts, reshares, comments, or messages (e.g., messages sent between two or more users in a messaging application associated with the social-networking system 160) associated with a multimedia object (e.g., from a post, reshare, comment, or message that links to the multimedia object). The posts, reshares, comments, or messages may be made by other users of the online social network, or by the user sending the search query from the client device 130. Each of the identified multimedia objects may have been indexed with one or more keywords substantially matching the one or more n-grams of the search query. In particular embodiments, in searching the index of multimedia objects, the social-networking system 160 may first access the index of multimedia objects which may include a plurality of entries. The index may be a post index (a forward index), a multimedia index (an inverted index), or a keyword index (an inverted index). Each entry may include a multimedia object (or a link to the multimedia object) and the one or more keywords associated with the multimedia object, along with associated social signal counts such as the number of associated views, reshares, likes, or comments (see below) within the online social network or on third-party websites. The social-networking system 160 may then identify one or more multimedia objects based on matching the one or more n-grams of the search query with the one or more keywords associated with the multimedia objects (e.g., by comparing the characters of the keywords with the characters of the n-grams). In particular embodiments, the index may include keywords extracted from metadata associated with a linked multimedia object (e.g., blurbs and titles associated with the multimedia object that may exist natively on the online social network or on third-party websites) or metadata associated with a post, reshare, the comments thereof, or messages (e.g., a time or date stamp of a post/reshare/comment, a location from which a post/reshare/comment was uploaded, a location tagged in a post/reshare/comment, an author name for a post/reshare/comment).

In particular embodiments, the search query may include a content object type identifier, and the search results may include external objects having types that correspond to the object type identifier. In particular embodiments, the search query may include a service identifier that identifies an online service, and the search results may include external objects associated with the online service. As an example and not by way of different limitation, types of content, such as social network posts, may be searched for and linked to. The user may include a file type in the search query string to find a particular type of content, e.g., "jpg" or ".gif" to find photos by matching URL's that end in "jpg" or ".gif". For music, a search query that specifies a band's name can be extended by appending the name of an online music service to the query e.g., "lorde soundcloud"). To find videos, a video filter may be applied by adding the names of online video hosting sites to the search query (e.g., "man beats train youtube"). To find products, the name of an online store or other merchant site may be added to the search query (e.g., "bluebook 20th edition amazon"). Decreasing the size of the corpus to be searched in this way increases the search's ability to rank the content properly. For example, when a search is known to be for a video, links that are not to videos may be excluded from the search.

In particular embodiments, the social-networking system 160 may send, to the client device 130 in response to the search query, one or more of the search results for display in the link-search interface to the first user. As an example and not by way of limitation, the search results may include short descriptions and/or graphical renderings of the matching content objects, and are presented to the user in the link-search interface. The matching content objects may be Internet web pages or social-network pages (which may include social-network content such as articles or posts). The short descriptions may be excerpts of the title and text of each matching content object, and the graphical renderings may be thumbnail images of web pages or single frames of video content of the web pages.

In particular embodiments, the social-networking system 160 may receive, from the client device 130, an indication the first user has selected a first search result of the one or more search results. As an example and not by way of limitation, when the user selects one of the matching content objects 342, 344 shown in FIG. 3D, a link to the selected content object is embedded in the comment being composed. For example, if the user selects the content object 344, which is a video on a web page hosted by the site youtube.com, a web link to the youtube.com video, such as the URL http://www.youtube.com/watch?v=dtkBBLKK9lo, is embedded in the comment being composed, as shown in FIG. 3E. When the user selects one of the matching content objects 342, 344, the application executing on a client device 130 may send the indication the first user has selected a first search result to a server 162 of the social-networking system. Although this disclosure describes receiving and embedding links in a particular manner, this disclosure contemplates receiving and embedding links in any suitable manner.

In particular embodiments, the social-networking system 160 may embed, in the first post being composed in the composer interface, a link to a first external object referenced by the first search result selected by the first user. As an example and not by way of limitation, FIG. 3E shows a composer interface 352 that displays the comment 354 being composed. The comment 354 includes an embedded content object 356, in which a title ("Marvel's Captain A . . . "), a web link that identifies the source of the content object ("www.youtube.com"), and a thumbnail image 357 are displayed. The composer interface 352 also includes a text input field 358 in which a user may input text content for the comment using an input interface such as the touch-screen keyboard 346. As shown in FIG. 3F, the text content "Nice" has been received in the text input field 358. A user may select a post button 362 to post the comment 354, including the text content in the input field 358 and a link that corresponds to the content object 356, to the online social network.

In particular embodiments, the social-networking system 160 may post, on the online social network, the first post. The first user may be associated as an author with the first post. In particular embodiments, the social-networking system 160 may display the first post in one or more newsfeeds of one or more respective second users. The one or more newsfeeds may display content posted by the first user that is visible to the one or more second users. As an example and not by way of limitation, when the post button 362 of FIG. 3F is selected, the application submits the comment 354, e.g., by sending the comment 354 to a server 162 of the social-networking system. The application user interface 302 may optionally present a posting indication 373 in a list of comments 372 to indicate that the comment has been submitted, as shown in FIG. 3G. The posting indication 373 may include a name of the comment author 371, comment text 374 (e.g., "Nice"), a link 375 (e.g., URL) of the embedded content, and a "Posting . . . " indicator 376, which indicates that the comment is being posted. When the comment has been posted, the application user interface 302 shown in FIG. 3H displays a posted comment 378. As an example and not by way of limitation, the application may receive information from the server 162 indicating that the comment has been posted. The displayed posted comment 378 may represent a comment generated based on the comment content 354 that was received in the composer interface 352 shown in FIGS. 3E and 3F and posted to the online social network. The displayed posted comment 378 may include the comment author name 371, comment text 374, and embedded content object 380, which corresponds to the link 375 that is embedded in the posted comment 378. The embedded content object 380 includes a thumbnail image 382 of a frame of video content, text content 384, e.g., the title of the video and text associated with the video, and a name of the source of the content object (e.g., "www.youtube.com").

As another example and not by way of limitation, FIG. 4E shows a status composer interface 412 in which a status update is being composed. The status update includes an embedded content object 422, in which a title ("Lorde—Yellow Flicker Beat"), a name that identifies the source of the content object ("soundcloud.com"), and a thumbnail image are displayed. Text content "Nice" has been received in the text input field 414. A user may select a post button 415 to post the status update, including the text content in the input field 416 and a link that corresponds to the content object 422, to the online social network. When the post button 415 is selected, the application submits the status update to the online social network, and the application user interface 302 may optionally present a posting indication to indicate that the status update has been submitted (similar to the indication 373 shown in FIG. 3G). When the status update has been posted to the online social network, the application user interface 302 shown in FIG. 4F displays a posted status update 450. The displayed posted status update 450 represents a status update generated based on the status update content that was received in the status composer interface 412 shown in FIG. 4E and posted to the online social network. The displayed status update object 450 includes the comment author name 371, comment text 374, embedded content object 454 (which corresponds to a link that is embedded in the posted status update), and a name of the source of the content object (e.g., "soundcloud.com").

In particular embodiments, the social-networking system 160 may embed, in the first post, preview content based on at least a portion of the first external object. The preview content may include preview text, a preview image, a preview video, or any combination thereof. As an example and not by way of limitation, referring to FIG. 3H, The embedded content object 380 includes a thumbnail image 382 of a frame of video content. As another example and not by way of limitation, referring to FIG. 4F, the embedded content object 454 may be a thumbnail image associated with the embedded content object 454, e.g., a photo of an artist who performs audio content (if the embedded content object 454 includes audio content). Although this disclosure describes embedding preview content in a particular manner, this disclosure contemplates embedding preview content in any suitable manner. More information on ranking based on social signals associated with external objects may be found in U.S. patent application Ser. No. 14/640,461 filed 6 Mar. 2015, which is incorporated by reference.

Figure 5:
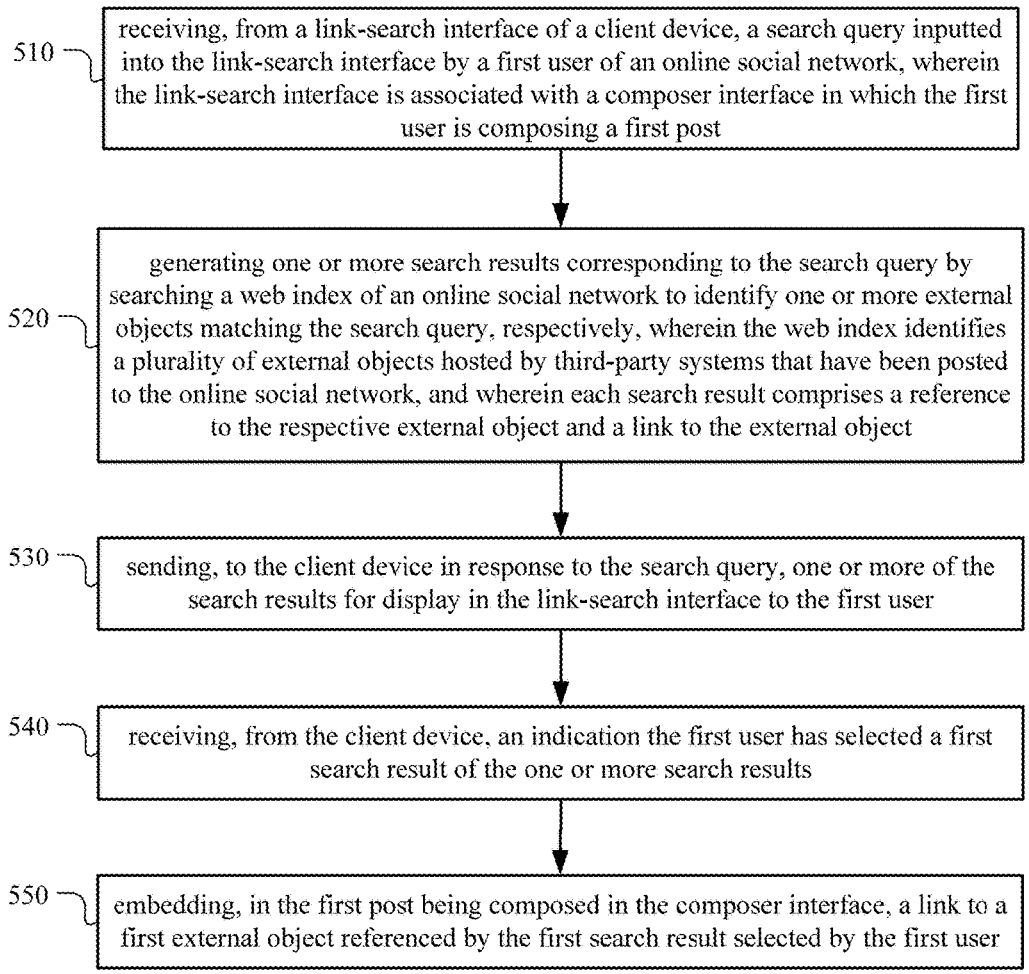
FIG. 5 illustrates an example method for embedding links in user-created content on an online social network.

FIG. 5 illustrates an example method 500 for embedding links in user-created content on an online social network. The method may begin at step 510, where the social-networking system 160 may receive, from a link-search interface of a client device 130, a search query inputted into the link-search interface by a first user of an online social network, wherein the link-search interface is associated with a composer interface in which the first user is composing a first post. At step 520, the social-networking system 160 may generate one or more search results corresponding to the search query by searching a web index of an online social network to identify one or more external objects matching the search query, respectively, wherein the web index identifies a plurality of external objects hosted by third-party systems that have been posted to the online social network, and wherein each search result comprises a reference to the respective external object and a link to the external object. At step 530, the social-networking system 160 may send, to the client device 130 in response to the search query, one or more of the search results for display in the link-search interface to the first user. At step 540, the social-networking system 160 may receive, from the client device 130, an indication the first user has selected a first search result of the one or more search results. At step 550, the social-networking system 160 may embed, in the first post being composed in the composer interface, a link to a first external object referenced by the first search result selected by the first user. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for embedding links in user-created content on an online social network including the particular steps of the method of FIG. 5, this disclosure contemplates any suitable method for embedding links in user-created content on an online social network including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
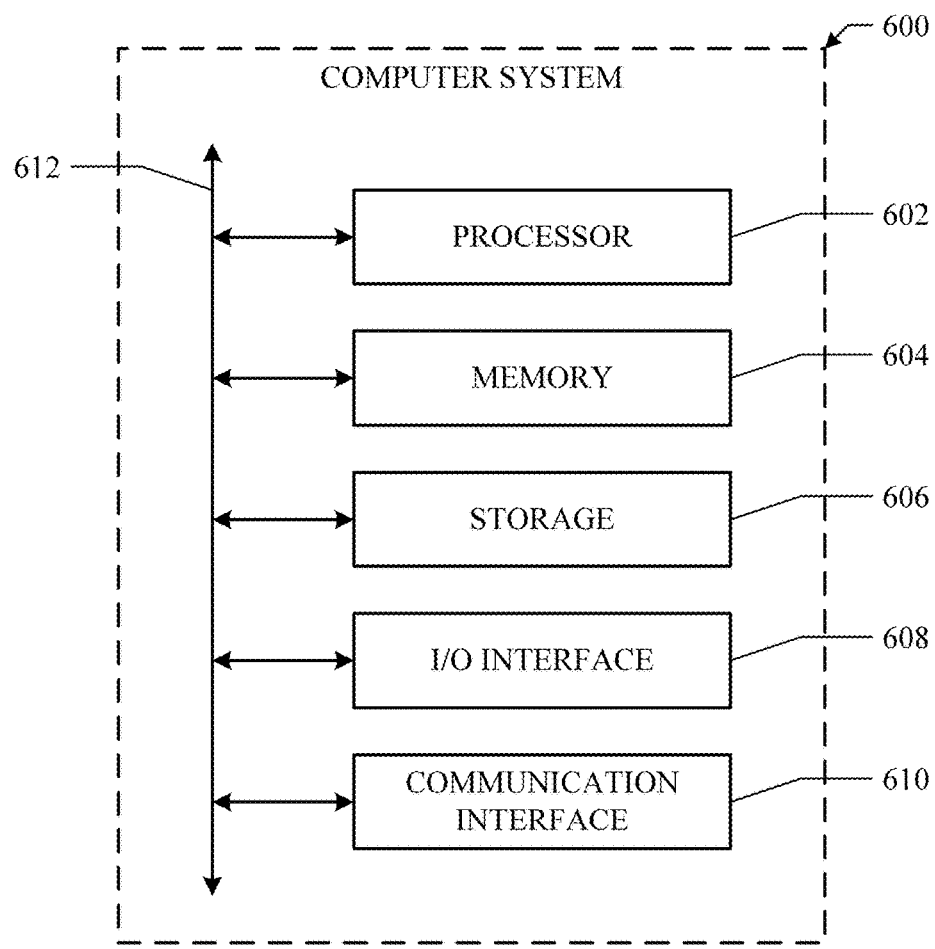
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices associated with an online social network:
    receiving, from a link-search interface of a social-networking application being executed on a client device, a search query inputted into the link-search interface by a first user of the online social network, wherein the link-search interface is accessed from a composer interface of the social-networking application in which the first user is composing a first post comprising a first content object, wherein the link-search interface enables the first user to search for and embed one or more links to one or more external objects into posts being composed in the composer interface;
    generating one or more search results corresponding to the search query by searching a web index of the online social network to identify one or more external objects matching the search query, respectively, wherein the web index identifies a plurality of external objects hosted by third-party systems that have been previously posted to the online social network, and wherein each search result comprises a reference to the respective external object and a link to the external object;
    sending, to the client device in response to the search query, one or more of the search results for display in the link-search interface to the first user;
    receiving, from the client device, an indication the first user has selected a first search result of the one or more search results displayed in the link-search interface; and
    embedding, in line with the first content object in the first post being composed in the composer interface, a link to a first external object referenced by the first search result selected by the first user from the link-search interface.

2. The method of claim 1, wherein each of the external objects comprises one or more of text, a web page, a web link, a graphical image, a video object, an audio object, a multimedia object, an application, or any combination thereof.

3. The method of claim 1, further comprising:
    accessing a social graph comprising a plurality of nodes and a plurality of edges connecting the nodes, each of the edges between two of the nodes representing a single degree of separation between them, the nodes comprising:
        a first node corresponding to the first user of the online social network; and
        a plurality of second nodes that each correspond to a concept or a second user associated with the online social network.

4. The method of claim 1, wherein the composer interface comprises a selectable link-search element that is operable to generate the link-search interface, and wherein the link-search interface is displayed on the client device in response to receiving an indication that the first user has selected the link-search element.

5. The method of claim 1, wherein the link-search interface comprises a query input interface configured to receive the search query.

6. The method of claim 1, further comprising:
    receiving, at the client device, a request for the link-search interface, wherein the link-search interface is displayed on the client device responsive to the request; and
    sending, to the client device, one or more null-state search results for display in the link-search interface to the first user.

7. The method of claim 6, wherein each null-state search result comprises a reference and a link to an external object previously selected by the first user.

8. The method of claim 6, wherein each null-state search result comprises reference and a link to an external object recently viewed by the first user.

9. The method of claim 6, wherein there are a threshold number of null-state search results.

10. The method of claim 6, wherein the link-search interface is pre-populated with a prior search query previously inputted by the first user, and wherein the null-state search results correspond to one or more external objects matching the prior search query.

11. The method of claim 1, wherein the search query comprises a character string comprising one or more characters, and search results are generated responsive to the first user inputting an additional character into the character string.

12. The method of claim 1, further comprising embedding, in the first post, preview content based on at least a portion of the first external object.

13. The method of claim 12, wherein the preview content comprises one or more of: preview text, a preview image, a preview video, or any combination thereof.

14. The method of claim 1, further comprising posting, on the online social network, the first post, wherein the first user is associated as an author with the first post.

15. The method of claim 1, wherein the web index indexes the plurality of external objects and one or more keywords associated with each external object, wherein each identified external object is indexed with one or more keywords substantially matching the search query.

16. The method of claim 1, wherein searching the web index to identify one or more external objects matching the search query comprises:
accessing the web index, the web index comprising a plurality of entries, each entry comprising a link to an external object and one or more keywords extracted from a post, reshare, comment, or message comprising a link to the external object; and
identifying one or more posts, reshares, comments, or messages linking to one or more linked external objects based on matching the search query with the one or more keywords extracted from the identified one or more posts, reshares, comments, or messages,
wherein the one or more identified external objects matching the search query are linked to by the one or more posts, reshares, comments, or messages.

17. The method of claim 1, further comprising:
calculating, for each identified external object, an object-score based on one or more social signals associated with the identified external object,
wherein the respective external object referenced by each search result has an object-score greater than a threshold score.

18. The method of claim 17, wherein the search results are ranked based at least in part on the object-score of each external object.

19. The method of claim 17, wherein the web index comprises at least one counter that records a number of social signals associated with each external object within the online social network, and the object-score for each identified external object is calculated based on the counter associated with the identified external object.

20. The method of claim 19, each entry of the web index comprising:
a URL of an external object hosted by the third-party system;
one or more post identifiers each linking to each of one or more posts of the online social network that comprise the URL of the entry of the index;
the counter that records the number of social signals associated with the external object; and
metadata associated with the external object linked in the particular post, the metadata comprising information associated with the external object.

21. The method of claim 19, wherein the social signals associated with each external object comprise one or more of:
an indication of a post linking to the external object, the post comprising one or more of:
an original post linking to the external object;
a comment on a post linking to the external object; and
a reshare of a post linking to the external object;
an accessing or viewing of the original post, the comment, or the reshare linking to the external object;
a like of the original post, the comment, or the reshare linking to the external object;
a click-thru of a link to the external object in the original post, the comment, or the reshare linking to the external object; or
any combination thereof.

22. The method of claim 1, wherein the search query comprises a content object type identifier, and the search results comprise one or more external objects having types that correspond to the object type identifier.

23. The method of claim 1, wherein the search query comprises a service identifier that identifies an online service, and the search results comprise one or more external objects associated with the online service.

24. One or more computer-readable non-transitory storage media embodying software that is operable when executed to:
receive, from a link-search interface of a social-networking application being executed on a client device, a search query inputted into the link-search interface by a first user of an online social network, wherein the link-search interface is accessed from a composer interface of the social-networking application in which the first user is composing a first post comprising a first content object, wherein the link-search interface enables the first user to search for and embed one or more links to one or more external objects into posts being composed in the composer interface;
generate one or more search results corresponding to the search query by searching a web index of the online social network to identify one or more external objects matching the search query, respectively, wherein the web index identifies a plurality of external objects hosted by third-party systems that have been previously posted to the online social network, and wherein each search result comprises a reference to the respective external object and a link to the external object;
send, to the client device in response to the search query, one or more of the search results for display in the link-search interface to the first user;
receive, from the client device, an indication the first user has selected a first search result of the one or more search results displayed in the link-search interface; and
embed, in line with the first content object in the first post being composed in the composer interface, a link to a first external object referenced by the first search result selected by the first user from the link-search interface.

25. A system comprising: one or more processors; and a non-transitory memory coupled to the processors comprising instructions executable by the processors, the processors operable when executing the instructions to:
receive, from a link-search interface of a social-networking application being executed on a client device, a search query inputted into the link-search interface by a first user of an online social network, wherein the link-search interface is accessed from a composer interface of the social-networking application in which the first user is composing a first post comprising a first content object;

generate one or more search results corresponding to the search query by searching a web index of the online social network to identify one or more external objects matching the search query, respectively, wherein the web index identifies a plurality of external objects hosted by third-party systems that have been previously posted to the online social network, and wherein each search result comprises a reference to the respective external object and a link to the external object;

send, to the client device in response to the search query, one or more of the search results for display in the link-search interface to the first user;

receive, from the client device, an indication the first user has selected a first search result of the one or more search results displayed in the link-search interface; and embed, in line with the first content object in the first post being composed in the composer interface, a link to a first external object referenced by the first search result selected by the first user from the link-search interface.

26. The system of claim 25, wherein each of the external objects comprises one or more of text, a web page, a web link, a graphical image, a video object, an audio object, a multimedia object, an application, or any combination thereof.

27. The system of claim 25, wherein the processors are further operable when executing the instructions to:
access a social graph comprising a plurality of nodes and a plurality of edges connecting the nodes, each of the edges between two of the nodes representing a single degree of separation between them, the nodes comprising:
a first node corresponding to the first user of the online social network; and
a plurality of second nodes that each correspond to a concept or a second user associated with the online social network.

28. The system of claim 25, wherein the composer interface comprises a selectable link-search element that is operable to generate the link-search interface, and wherein the link-search interface is displayed on the client device in response to receiving an indication that the first user has selected the link-search element.

29. The system of claim 25, wherein the link-search interface comprises a query input interface configured to receive the search query.

30. The system of claim 25, wherein the processors are further operable when executing the instructions to:
receive, at the client device, a request for the link-search interface, wherein the link-search interface is displayed on the client device responsive to the request; and
send, to the client device, one or more null-state search results for display in the link-search interface to the first user.

31. The system of claim 30, wherein each null-state search result comprises a reference and a link to an external object previously selected by the first user.

32. The system of claim 30, wherein each null-state search result comprises reference and a link to an external object recently viewed by the first user.

33. The system of claim 30, wherein there are a threshold number of null-state search results.

34. The system of claim 30, wherein the link-search interface is pre-populated with a prior search query previously inputted by the first user, and wherein the null-state search results correspond to one or more external objects matching the prior search query.

35. The system of claim 25, wherein the search query comprises a character string comprising one or more characters, and search results are generated responsive to the first user inputting an additional character into the character string.

36. The system of claim 25, wherein the processors are further operable when executing the instructions to embed, in the first post, preview content based on at least a portion of the first external object.

37. The system of claim 25, wherein the preview content comprises one or more of: preview text, a preview image, a preview video, or any combination thereof.

38. The system of claim 25, wherein the processors are further operable when executing the instructions to post, on the online social network, the first post, wherein the first user is associated as an author with the first post.

39. The system of claim 25, wherein the web index indexes the plurality of external objects and one or more keywords associated with each external object, wherein each identified external object is indexed with one or more keywords substantially matching the search query.

40. The system of claim 25, wherein the instructions to search the web index to identify one or more external objects matching the search query comprise instructions to:
access the web index, the web index comprising a plurality of entries, each entry comprising a link to an external object and one or more keywords extracted from a post, reshare, comment, or message comprising a link to the external object; and
identify one or more posts, reshares, comments, or messages linking to one or more linked external objects based on matching the search query with the one or more keywords extracted from the identified one or more posts, reshares, comments, or messages,
wherein the one or more identified external objects matching the search query are linked to by the one or more posts, reshares, comments, or messages.

41. The system of claim 25, wherein the processors are further operable when executing the instructions to:
calculate, for each identified external object, an object-score based on one or more social signals associated with the identified external object,
wherein the respective external object referenced by each search result has an object-score greater than a threshold score.

42. The system of claim 25, wherein the search results are ranked based at least in part on the object-score of each external object.

43. The system of claim 42, wherein the web index comprises at least one counter that records a number of social signals associated with each external object within the online social network, and the object-score for each identified external object is calculated based on the counter associated with the identified external object.

44. The system of claim 43, each entry of the web index comprising:
a URL of an external object hosted by the third-party system;

one or more post identifiers each linking to each of one or more posts of the online social network that comprise the URL of the entry of the index;

the counter that records the number of social signals associated with the external object; and metadata associated with the external object linked in the particular post, the metadata comprising information associated with the external object.

45. The system of claim 43, wherein the social signals associated with each external object comprise one or more of:

an indication of a post linking to the external object, the post comprising one or more of:
  an original post linking to the external object;
  a comment on a post linking to the external object; and
  a reshare of a post linking to the external object;
an accessing or viewing of the original post, the comment, or the reshare linking to the external object;
a like of the original post, the comment, or the reshare linking to the external object;
a click-thru of a link to the external object in the original post, the comment, or the reshare linking to the external object; or
any combination thereof.

46. The system of claim 25, wherein the search query comprises a content object type identifier, and the search results comprise one or more external objects having types that correspond to the object type identifier.

47. The system of claim 25, wherein the search query comprises a service identifier that identifies an online service, and the search results comprise one or more external objects associated with the online service.

* * * * *